E. Q. STACY.
HANGER FOR SWINGS AND OTHER ARTICLES.
APPLICATION FILED SEPT. 24, 1920.
1,408,912.  Patented Mar. 7, 1922.
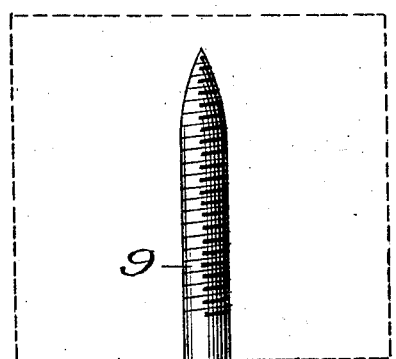
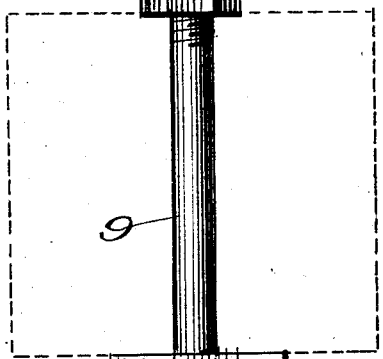
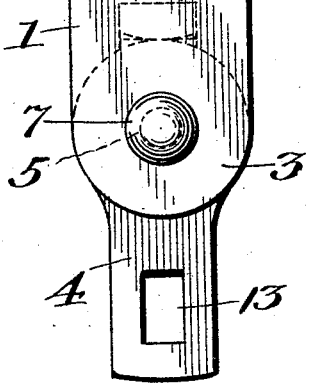
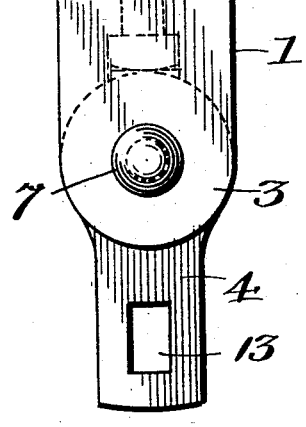
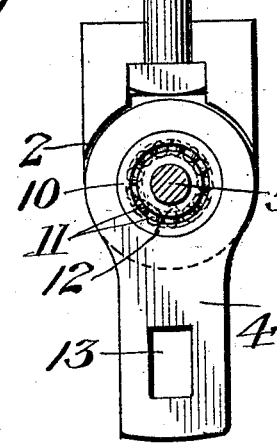
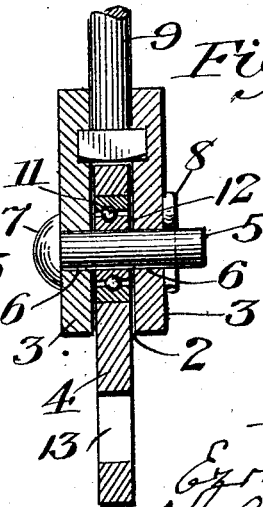
Inventor:
Ezra Q. Stacy

UNITED STATES PATENT OFFICE.

EZRA QUARTERMAN STACY, OF THOMASVILLE, GEORGIA.

HANGER FOR SWINGS AND OTHER ARTICLES.

1,408,912.  Specification of Letters Patent.  Patented Mar. 7, 1922.

Application filed September 24, 1920. Serial No. 412,454.

*To all whom it may concern:*

Be it known that I, EZRA Q. STACY, a citizen of the United States, residing at Thomasville, in the county of Thomas and State of Georgia, have invented certain new and useful Improvements in Hangers for Swings and other Articles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to hangers for swings and other articles, and has for its object to provide a hanger in which the parts may be readily assembled and disassembled and in which the ball bearing for the pivot pin connecting the head and swinging tongue or member may be removed with the tongue or swinging member without separation of the bearing from said member.

To the accomplishment of the foregoing and such other objects as may hereinafter appear, the invention consists in the features hereinafter described and then sought to be clearly defined by the claims, reference being had to the accompanying drawing forming part hereof.

Figs. 1 and 2 are side views of the hanger in position, one view showing a screw shank and the other a bolt;

Fig. 3 is a side view with one side of the head-block omitted to show the interior construction;

Fig. 4 is a vertical cross-section through the hanger.

In the drawing the numeral 1 designates a head or block formed with a slot or bifurcation 2 to form side cheeks or lips 3 designed to receive the swinging member or tongue 4 which will be held therein by a pivot pin or bolt 5 passing through holes 6 in the cheeks or lips and through the swinging member or tongue and held in place by a head 7 formed on one end of the pin and a cotter pin 8 passed through the other end, or otherwise. The head or block 1 is formed or provided with a threaded bolt or stem 9 by which it may be supported from any suitable support; and the swinging member or tongue 4 has fitted therein a ball-race 10 containing a number of anti-friction balls 11 which also lie in a peripheral groove formed in a central rotatable hub 12 through which the pivot pin 5 passes. The parts 10, 11 and 12 are inserted as a unit in the opening formed in the member 4. The swinging member or tongue 4 is formed with a suitable opening 13 to receive a chain or cable by which a swing may be suspended from the hanger. The cable receiving opening may be of any suitable form but it is preferred to form it with closed walls so that the cable or chain cannot slip or be accidentally displaced therefrom in use of the swing.

By forming the swinging member or tongue and ball-bearing as a unit the anti-friction balls are retained in place when the tongue is separated from the head or block and the head and tongue can be quickly assembled without liability of the bearings getting out of position or lost; the elements constituting the hanger are reduced in number and consequent friction and wear lessened, and greater strength and durability obtained.

The suspending stem 9 may be attached to the head-block otherwise than as shown, for instance, it may be screw threaded into the head-block, or otherwise, as judgment may suggest. When the hanger is placed in position the top surface of the head-block will fit squarely against the under surface of the support from which suspended and thus relieve angular strain from the sustaining stem or bolt.

The several parts may be of any metal preferred or material best suited for the purpose and of dimensions desired.

Having described my invention and set forth its merits what I claim is:

1. A swing hanger comprising a head or block bifurcated to form side cheeks or lips and provided with means for attachment to a support, a swinging tongue or member having a ball-bearing seated in one end thereof as a unit therewith, said bearing being removable with the swinging member without separation of parts of the bearing, the ball-bearing end of the swinging member lying within the slot of the head or block, and a pivot-pin passing through the cheeks of the head and the ball-bearing of the swinging member.

2. A swing hanger comprising a bifurcated head or block provided with means for attachment to a support, a swinging member having seated in one end a ball-race and rotatable hub with balls between the race and hub and fitted in the bifurcation of the head or block, and a pivot-pin passing through the bifurcated head and hub of the swinging member.

In testimony whereof I affix my signature in presence of two witnesses.

EZRA QUARTERMAN STACY.

Witnesses:
MARTHA PEACOCK,
J. T. CULPEPPER, Jr.